US006438563B1

(12) United States Patent
Kawagoe

(10) Patent No.: US 6,438,563 B1
(45) Date of Patent: Aug. 20, 2002

(54) METHOD AND DEVICE FOR SYNCHRONIZING DATABASES IN A NETWORK MANAGEMENT SYSTEM

(75) Inventor: Teruyuki Kawagoe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/441,089

(22) Filed: Nov. 16, 1999

(30) Foreign Application Priority Data

Nov. 27, 1998 (JP) .......................................... 10-338055

(51) Int. Cl.[7] .......................... G06F 12/00; G06F 17/30
(52) U.S. Cl. ....................................... 707/201; 709/223
(58) Field of Search ................................ 707/200, 201, 707/202, 204, 223, 8, 21; 709/223

(56) References Cited

U.S. PATENT DOCUMENTS

| | | | | |
|---|---|---|---|---|
| 5,774,689 A | * | 6/1998 | Curtis et al. .................. | 703/21 |
| 5,884,328 A | * | 3/1999 | Mosher, Jr. .................. | 707/202 |
| 5,966,713 A | * | 10/1999 | Carlsund et al. ............ | 707/200 |
| 6,052,724 A | * | 4/2000 | Willie et al. ................. | 709/223 |
| 6,081,806 A | * | 6/2000 | Chang et al. ................. | 707/8 |
| 6,098,076 A | * | 9/2000 | Rekieta et al. ............... | 707/202 |
| 6,169,794 B1 | * | 1/2001 | Oshimi et al. ................ | 707/10 |
| 6,216,135 B1 | * | 4/2001 | Brodersen et al. .......... | 707/201 |
| 6,226,650 B1 | * | 5/2001 | Mahajan et al. ............. | 707/201 |
| 6,230,164 B1 | * | 5/2001 | Rekieta et al. ............... | 707/201 |
| 6,243,715 B1 | * | 6/2001 | Bogantz et al. .............. | 707/201 |
| 6,295,540 B1 | * | 9/2001 | Sanchagrin et al. ......... | 707/201 |
| 6,324,547 B1 | * | 11/2001 | Lennert et al. ............... | 707/204 |

FOREIGN PATENT DOCUMENTS

| | | |
|---|---|---|
| JP | 2-2280 | 1/1990 |
| JP | 9-186686 | 7/1997 |
| JP | 9-265426 | 10/1997 |

* cited by examiner

*Primary Examiner*—John Breene
*Assistant Examiner*—Susan Rayyan
(74) *Attorney, Agent, or Firm*—Sughrue Mion, PLLC

(57) ABSTRACT

A management information database (MIB) of network manager (NM) 200 and network elements (NE) 220–22N each store management information and database identifiers that indicate the update history of the management information. Database information is updated each time NM 200 sets or manipulates management information of each of NE 220–22N, and includes the identifiers of the NM and NE, that are subject to manipulation as well as access time 401 that indicates the time operations were carried out. When the management information database within the NM is substituted (overwritten) by back-up data due to, for example, damage, the database information stored by each of the NM and the NE is compared upon subsequent access of the NE, and in the event of discrepancies, the management information stored in the NE is uploaded and the management information stored in the management information database of the NM is updated by that management information to synchronize the management information of the MIB and the NE. The NE is then eliminated as a candidate for database information comparison.

15 Claims, 10 Drawing Sheets

FIG. 10

| | n | m | l | k | |
|---|---|---|---|---|---|
| | 00000111 | 00000101 | 00000010 | 00000010 | 1 |
| | 401 | 402 | 403 | 404 | |

| | n | m | l | k | |
|---|---|---|---|---|---|
| | 00110101 | 00000101 | 00000010 | 00000001 | 1 |

MANAGEMENT INFORMATION OF NM (a) — 101 ↔ DATABASE INFORMATION OF NM (table A)

MANAGEMENT INFORMATION OF NE (a) — 101 ↔ DATABASE INFORMATION OF NE (table B)

METHOD AND DEVICE FOR SYNCHRONIZING DATABASES IN A NETWORK MANAGEMENT SYSTEM

BACKGROUND OF THE INVENTION

1. Field of the Invention

The present invention relates to a synchronizing method and device of a Management Information Base (hereinbelow abbreviated as MIB) in a Network Management System (hereinbelow abbreviated as NMS). Described in greater detail, a MIB is a database that stores data for the control by a Network Manager (hereinbelow abbreviated NM) of a plurality of Network Elements (hereinbelow abbreviated NE) that are connected to a communication network. The present invention relates to a method and a device for reloading to the MIB back-up data, which have been saved in advance, when the content of this MIB has for some reason been damaged or altered, and moreover, for synchronizing these data with the current information of each NE.

2. Description of the Related Art

In the prior art, message format or communication protocol is stipulated in advance in a communication network to which a multiplicity of NE are connected, and by means of these standards, the NMS manages the various configuration settings and controls for the plurality of NE that make up the communication network. The NMS gathers the management information held by each NE in order to realize this management, and in addition to generating its own management information and registering this information in the MIB, uses this MIB to manage the NE and communication network.

The network management referred to here pertains to controlling the configuration, operation, and maintenance of the communication network, and a NM is constituted by a computer in which are installed application programs for managing the configuration, detecting trouble, and monitoring the performance of the NE and lines on the communication network. On the other hand, the NE each have their own respective specific functions, but as for functions relating to the communication network, are provided with only extremely basic operation functions such as individual control, call processing, and information transfer. NE do not have operation capabilities that exceed this extent.

The NM and NE are normally connected by a control network for transmitting management information apart from the communication network. The NM analyzes and judges data provided from each individual NE by way of this control network, and moreover, executes a series of operations such as instructing each individual NE to carry out specific operations based on the results of analysis and judgment. Usually, only one such NM exists for one network, but the number of NM is not restricted to one, and in the case of a large-scale network, one or more NM may exist according to management zones or functions.

The communication of various settings and control signals between the NM and NE is carried out according to a specific communication protocol that is established for each network. Representative communication protocol types include CMIP (Common Management Information Protocol) that conforms with OSI (Open System Interconnection) established by the ISO (International Organization for Standardization), and the simpler protocol, SNMP (Simple Network Management Protocol).

Taking one case in which SNMP protocol is used as one example, a specific NM and a plurality of NE exist in a network, and the NM transmits commands such as "get-request" and "set-request" established by SNMP, collects management information from each NE, and executes management operations such as configuration management and trouble management by, for example, exchanging setting information.

A MIB in this case is a database for storing management information that is used when network management is carried out by means of OSI management or SNMP. In addition, the stored management information is a logical model of the various NE functions that are necessary elements for management by the NM, and this information includes as attributes identifiers and detailed definitions of function operations. For a NE that switches lines, for example, upon defining the management information that represents the function of the hardware switch and, as the attribute of this information, the operating state of the switch, this NE executes operations such as receiving commands from the NM, informing the NM of operating states, and actually operating the switch. In other words, all information that the NM and NE save relating to management information is referred to as MIB, and the NM can manage the various functions within the NE by means of management information, which is an abstract representation.

Operation that is exercised from the NM upon the NE is executed by designating identification numbers of management information defined in this MIB, using commands such as "Get" and "Set," and carrying out a setting operations of the management information of the NE (setting of operating conditions, the starting and halting of operations, as well as the generation, and deletion of the management information itself).

FIG. 1 is a conceptual view showing the positioning of the NM. NM 120 shown in FIG. 1 is connected to each NE on communication network 100 by control network 110 and carries out communication by a specified control protocol.

As a provision against data loss due to failures, back-up data of database MIB 140 that is managed by NM 120 are copied to external storage medium 130 on a regular basis such as, for example, once each week. However, the operations of setting or reading out the values of the various information from NM 120 to the group of NE of communication network 100 is carried out many times every day, and differences in information between the content of MIB data 140 and the content of copied data in external storage medium 130 therefore increase in proportion to the time that elapses from the time of copying of back-up data to external storage medium 130.

For example, a case is explained in which the data of MIB 140 of NM 120 becomes unusable due to some type of trouble. At this time, the back-up data stored beforehand in external storage medium 130 are restored to MIB 140 of NM 120. In other words, when back-up data are reloaded to the machine memory during operation, the information in the memory of NM 120 is su overwritten by the back-up data. In this case, there is a high possibility that information that is currently set in the NE differs from the information at the time the back-up data were copied, and there is consequently a danger of a variety of new problems occurring due to conflicts in data if operations are continued with this unaltered data.

Assuming that the restored data are data that were saved in external storage medium 130 from MIB 140 one week previously, in a worst case, the information of all NE being managed may become non-current. If several hundred NE are being managed by the NM in question, processing was consequently required for uploading information from this number of NE to synchronize the MIB data that were restored by the data of the previous week with the most recent information.

Japanese Patent Laid-open No. 186686/97 and Japanese Patent Laid-open No. 265426/97 are examples of the prior art that disclose similar database synchronization methods.

Japanese Patent Laid-open No. 186686/97 discloses the establishment of duplicate NM in which the occurrence of differences in the databases respectively managed by an active NM and a standby NM is prevented by periodically sending network management information from the active NM to the standby NM to synchronize the two NM.

Japanese Patent Laid-open No. 265426/97, on the other hand, discloses a database synchronizing method in which, when a database is distributed between the management system and a plurality of managed systems, the structuring and restructuring of each database is simplified by mutually exchanging system configuration information between the management system and managed systems to build a database having a tree structure. This published gazette, however, does not touch on a method for simplifying synchronization in the event of inconsistencies in states between the managing system and managed systems.

Theoretically, in the case of data synchronization for matching the content of a database that has been restored by back-up data to the current states within the network, information must be uploaded only from the NE in which states have been modified following update of back-up data. To realize this processing, however, the operator that carried out the operation must store or record what time and to which NE modifications were made. In addition, if there are more than one operator of the NM, all of these records must be compiled. The memory of all operators or a hard-copy record sheet is impossible to monitor, and this inability was a cause of faulty operation. In particular, in a large-scale communication network in which the states of each NE are modified at high frequency, there was the problem that NE with inconsistent management information occur at a high rate despite frequent collection of back-up data, and management was therefore difficult.

SUMMARY OF THE INVENTION

It is an object of the present invention to provide a network management system that enables synchronization of discrepancies in information between an operation database, i.e., an MIB, and NE with the minimum amount of processing and that allows the NM to resume management operations, even in cases in which the MIB is restored by past back-up information.

To achieve the above-described object, the present invention uses a database information managing unit provided within the NM to compare information stored in the MIB with information stored in NE, automatically detect NE for which discrepancies in data may exist, and upload the necessary information from only those NE even in a case in which the MIB is restored by back-up data to past information.

In other words, the database synchronization system of a network management system according to the present invention relates to a NM that manages a plurality of NE by modifying, by way of a control network, the stored "management information" and "database information" of each NE, i.e., the "information defining the functions of each NE" and "information showing the history of modifications of the times the content of management information of each NE was rewritten"; and includes the following means:

(1) an MIB for storing, corresponding to each NE, the management information and database information that are stored by each NE, as well as for periodically saving back-up data of the stored information;

(2) a NM control unit for, as the management operations of each NE, both modifying the setting content of management information stored in that NE and updating the management information content corresponding to that NE that is stored in the MIB to the same content;

(3) a database information managing unit for, when management operations for each NE are to be executed, i.e., when management information is to be modified, after the stored information of the MIB has been substituted by back-up data, first comparing the database information stored in the NE with the database information stored in the MIB that corresponds to that NE before setting the new management information, and if a discrepancy is detected in this comparison process, using the management information stored in that NE to update the corresponding management information of the MIB, and then eliminating that NE as an object of the database information comparison process until the stored information of the MIB is next substituted by back-up data.

In a case in which the MIB is substituted by back-up data and the version of the data becomes old, the NM uses a database information managing unit to compare the MIB information with the information of the NE before modifying the settings of the NE management information, and if discrepancies exist, updates the management information of the MIB to the management information of the NE.

In addition, when the database synchronizing system of the NMS of the present invention receives notice of recovery from a failure from a NE that has reported the occurrence of trouble, and the settings of the management information for managing that NE are to be modified, the above-described database information managing unit may compare the database information that is stored in that NE with database information of the MIB that corresponds to that NE, and if a discrepancy is detected, the management information of the NE may be updated to the corresponding management information of the MIB.

The NM of the present invention thus updates the management information of the NE using management information of the MIB when discrepancies in the management information are detected due to trouble originating in the NE.

In addition, the database information that corresponds to management information includes, as an access record: the access time, which is the time that the management information of a NE was accessed from a NM; an accessing NM identifier, which is the identifier of the NM that accessed the management information of the NE, and an accessed NE identifier which is the identifier of the NE that was accessed.

Upon detecting various events indicating trouble of the NM and NE, the NM control unit of this invention analyzes the event, divides the events between trouble originating in the NM, trouble originating in a NE, and compound problems of both, and carries out database synchronization in accordance with the category of the problem.

As explained hereinabove, when carrying out management operations with respect to each NE, the present invention first determines whether or not the management information of the relevant NE is synchronized with the data held by the NE and the data held by the MIB by comparing each database information that corresponds to the two sets of management information, and if not synchronized, synchronizes with the most recent management information, thereby allowing the operator to carry out normal operations without keeping track of the state of synchronization of the contents of each NE and MIB. Even in a case in which the MIB has been restored by back-up data and becomes an older version, for example, the data are automatically corrected and the operator is relieved of the unnecessary burden of updating the data.

Once the synchronization has been carried out for a NE, a synchronization process need not be repeated until the next time the MIB is restored, and moreover, an unnecessary burden is not placed on the system because no synchronization processes are performed for a NE that has not undergone any control operations.

Even in a case in which the management information that is stored in a NE is changed in its entirety due to, for example, a unit exchange, the NM distinguishes the necessity for a synchronization process based on the trouble category reported from the NE and performs synchronization distinguishing between cases that urgently require synchronization and cases that allow synchronization to be carried out separately. Accordingly, the operator of the NM can carry out operations without keeping track of the status of each NE within the communication network, and a network management system can be realized that places no unnecessary burden on the operator.

Finally, analyzing events that occur, such as trouble that is detected by the NM, determining whether the source of discrepancies in management information is the NM or the NE, and automatically activating the process of synchronizing the database enables a reduction of the manual synchronization work performed by the operator in the prior art and allows greater processing efficiency.

The above and other objects, features, and advantages of the present invention will become apparent from the following description referring to the accompanying drawings which illustrate the examples of the preferred embodiments of the present invention.

BRIEF DESCRIPTION OF THE DRAWINGS

FIG. 10 is a format diagram showing a concrete example of database information.

DETAILED DESCRIPTION OF THE PREFERRED EMBODIMENTS

Explanation is next presented regarding the embodiments of the present invention with reference to the figures.

Figure 1:
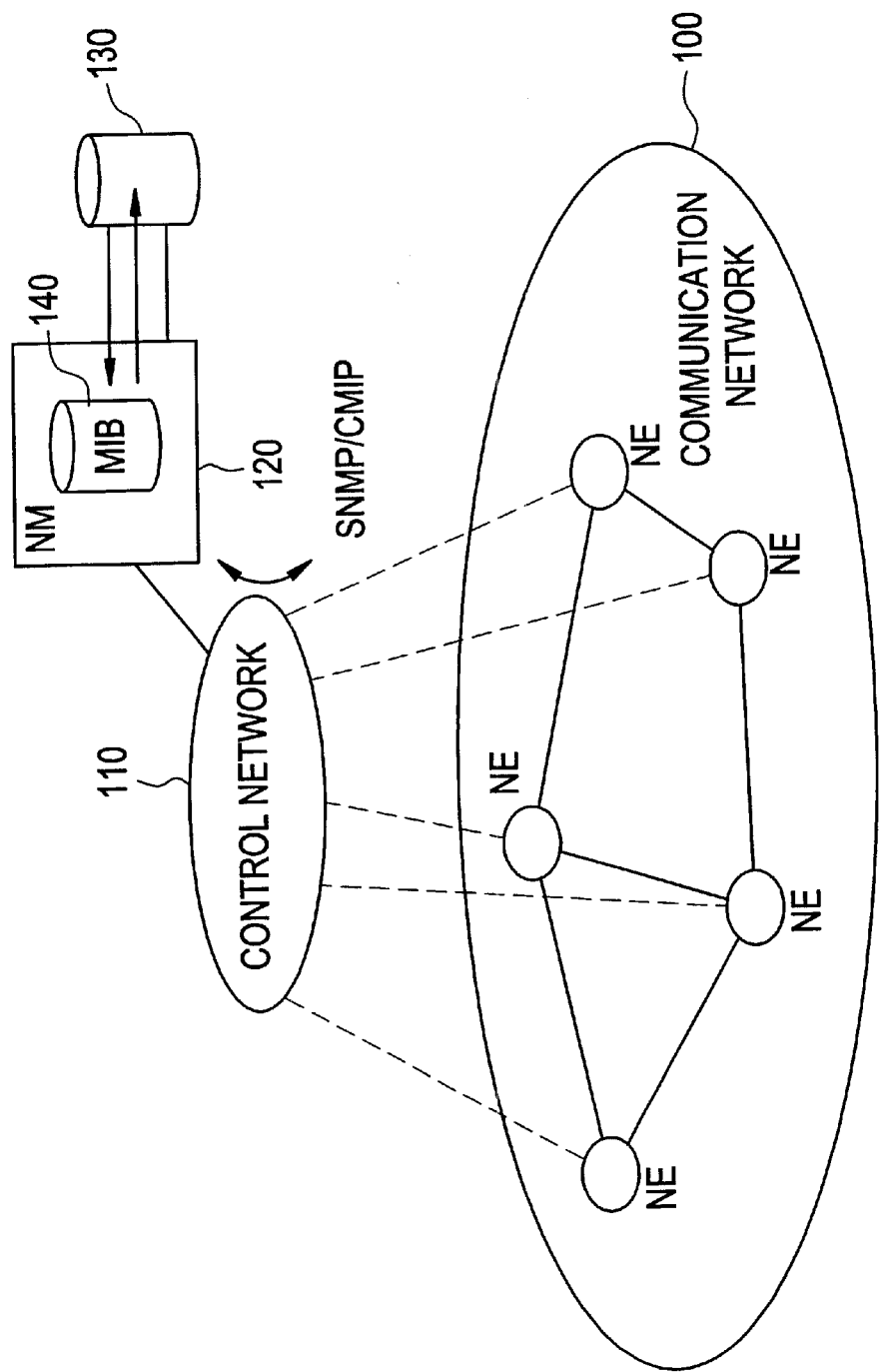
FIG. 1 is a conceptual view showing the positioning of the NM.
Figure 2:
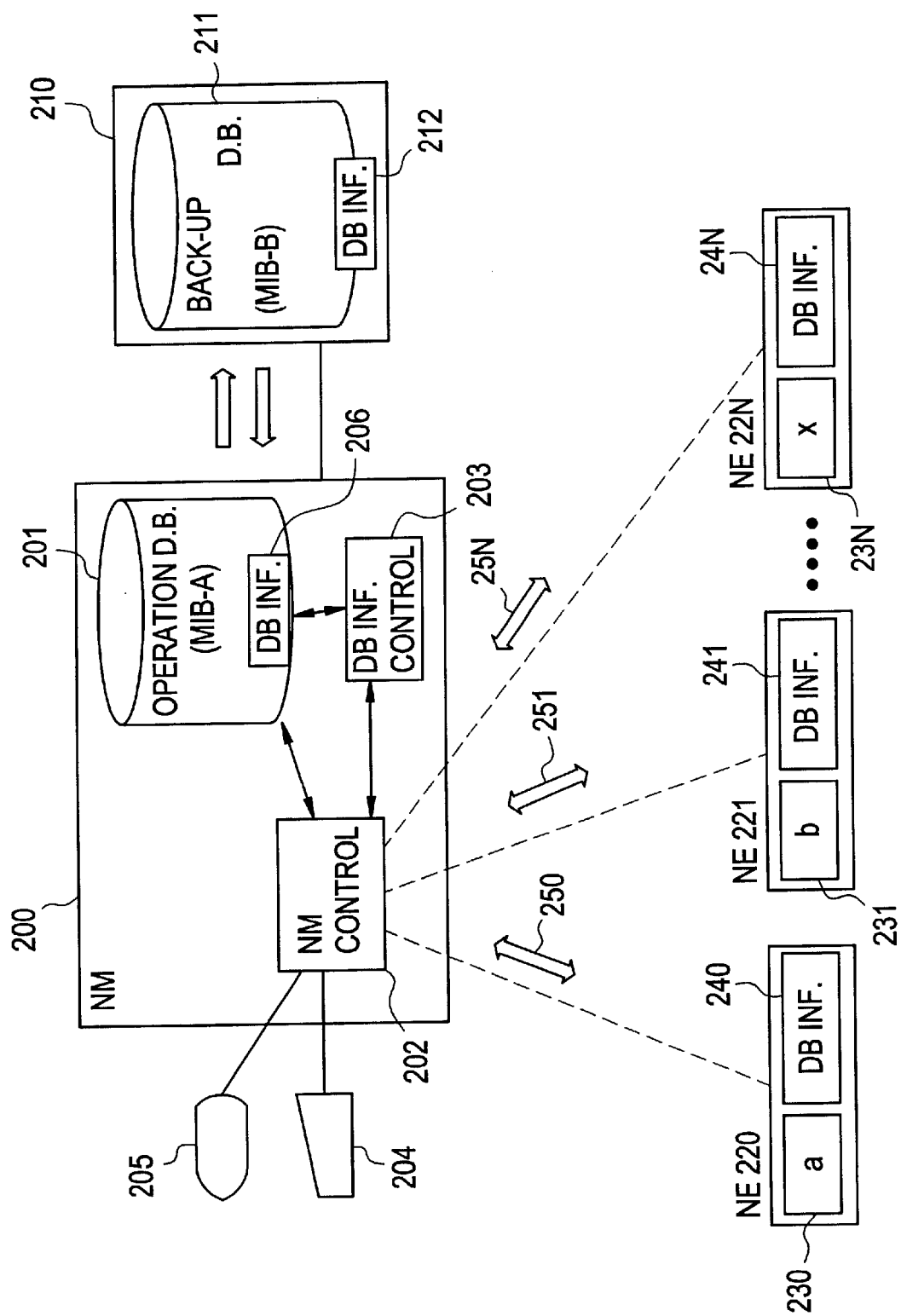
FIG. 2 is a block diagram showing the system configuration of the first embodiment of the present invention.

FIG. 2 is a block diagram showing the system configuration of the first embodiment of the present invention, this network management system including NM 200 for managing the network, a plurality of NE 220–22N which are the objects of management; and control network for transferring management information.

NM 200 is installed in a computer that operates under the control of a program and performs control as a NM and includes:

NM control unit 202 for providing the operation and maintenance functions of the communication network;

operation database 201 for storing MIB data A of the current operation; and database information managing unit 203 for managing the correspondence of the content of MIB data A and the content of management information 230–23N held by the NE, and for managing database information 240–24N, which is the information of the NE.

When NM control unit 202 detects each type of abnormality (referred to as an "event"), for example when NM control unit 202 detects the occurrence of an abnormal state such as restoring due to failure of the NM database or failure of a NE and communication recovery, it initiates a particular database synchronization that corresponds to each type of event, with the occurrence of that event as a trigger.

The various information of each of NE 220–22N that is necessary for managing the communication network is stored inside MIB data A. Each of NE 220–22N also defines as management information 230–23N the information inside the storage device of each NE 220–22N that has been set from the NM and information about the hardware held by each NE itself, this being logic al information. Database information managing unit 203 effects management by making this type of information that has been set in each NE correspond with information stored as MIB data A for each NE.

As a provision for a case in which the stored data become unusable due to some unforeseen failure, the information of MIB data A is backed-up as MIB data B of back-up database 211 by periodically saving data to external storage medium 210.

Figure 3:
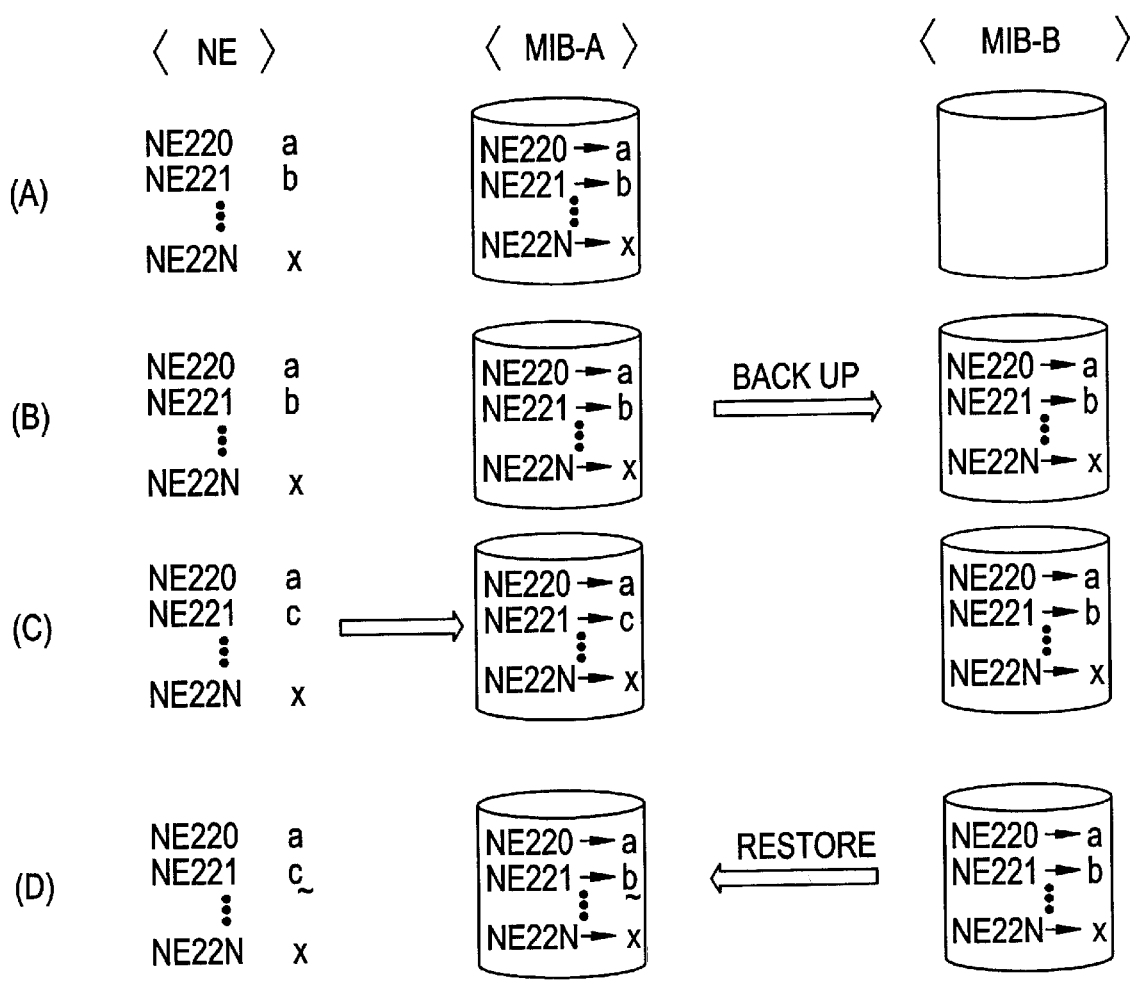
FIGS. 3(A)–(D) is a conceptual view for explaining transition of the MIB data content.

Next, details are explained up to the occurrence of discrepancies in data referring to this FIG. 2 and FIG. 3 (A)–(D), which show the transition of the content of MIB data.

FIG. 3(A) shows the state of each database before back-up of data. As for the state of each NE, management information "a" is stored in NE 220, management information "b" is stored in NE 221, and management information "x" is stored in NE 22N. At this point, MIB data A of operation database 201 NM 200 agrees with each individual management information 230–23N stored in each NE.

FIG. 3(B) shows the state in which the content of operation database 201 is stored in back-up data base 211. The information of operation database 201 at the time of back-up is copied to back-up database 211.

FIG. 3(C) shows the state in which a setting operation is carried out between NM 200 and NE 221 that accompanies the modification of functions of NE 221, the management information of NE 221 being modified from "b" to "c." The information of operation database 201 that corresponds to NE 221 is management information "c" and agrees with NE 221, but the content "b" of back-up database 211 does not match. Nevertheless, this discrepancy remains latent and cannot be seen from outside.

FIG. 3(D) shows the state in which operation database 201 is restored by back-up database 211 upon the occurrence of a failure of operation database 201. The content of back-up database 211, unchanged from its state at time (B), is written over operation database 201, the information regarding NE 221 becoming management information "b" and a discrepancy thus occurring with the actual management information "c" of NE 221.

Figure 4:
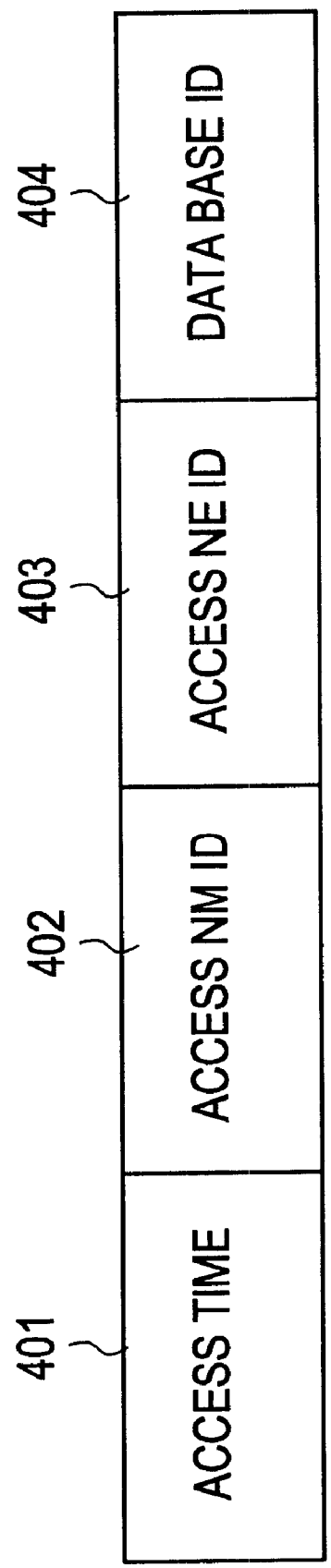
FIG. 4 is a format diagram showing the content of database information.

In the present invention, database information of the format shown in FIG. 4 is defined so that a discrepancy that occurs in this way between the content of operation database 201 and the management information held by a NE can be easily discovered, and so that the content of the operation database for only the NE in which a discrepancy occurs is synchronized.

This database information is stored to NM 200 and NE 220–22N as database information 206 and 240–24N corresponding to the respective management information by mutually exchanging NM/NE interface information 250–25N between NM 200 and NE 220–22N.

The database information shown in FIG. 4 is information that is updated each time management information are set from the NM to each NE, the content of this database information being made up of: access time 401 indicating the time of the setting of the management information from the NM to the NE; accessing NM identifier 402 indicating the NM that carried out the setting operation; accessed NE identifier 403 indicating the NE for which setting was carried out; and database identifier 404 for distinguishing the database on the NM that performed the access.

Updating of database information is realized by communicating each item of the database information from the transmission source to the transmission destination when transmitting and receiving messages for setting management information between the NM and NE by way of the control network. The aforementioned message transmission includes both transmitting from the NM to a NE and transmitting from a NE to the NM. At the NM, the identifier of the management information is designated, a message in which database information has been added to the transmitted setting control command are generated (these being referred to as "interface information 250–25N"), and this interface information 250–25N is transmitted to the target NE by way of the control network. NE 220–22N that have received interface information modify the settings of each individual management information 230–23N and rewrite database information 240–24N in accordance with the received setting control command and database information.

Access time 401 is information indicating the time that an operation such as GET/SET is carried out from the NM to a NE, and the access time of the database information held respectively by the NM and NE is updated when this access is effected. The setting of access time 401 is realized by reading the value of the access time within above-described interface information 250–25N and then writing to the database information of the NE, and not by setting the time at which the NE directly received interface information. Accordingly, clock discrepancies between the NM and NE or data transfer delays need not be considered in the comparison of access times of database information according to this method (to be described hereinbelow). In cases in which transfer delays can be ignored, moreover, the access time can be added at the receiving NE. The value of the access time in NE at the time of product shipping is "NULL."

As described hereinabove, accessing NM identifier 402 is an identifier that indicates the NM that effected access, and like the host names of workstations in which a plurality of NM are set, each NM has a unique name, and accessing NM identifier 402 is information that distinguishes the NM that performed access.

Accessed NE identifier 403 is the identifier of the NE that the NM manages. For example, when a new NE is established in a communication network and incorporated under the management of a NM, the NM registers the NE as ONU 1, and when initial registration for operations with the NE is carried out, the name ONU 1 is given to the database information of both the NM and the NE, thereby establishing management. The value of this identifier at the time of product shipping is "NULL."

Regarding database identifier 404, the identifier of the database for which back-up was carried out is updated each time the database is backed up. For example, if the initial value of the identifier is "1," the database remains "1" during operation, and the identifier is saved as "1+1=2" in the medium that accepts back-up. The value of this identifier in a NE at the time of product shipping is "NULL". The database identifier is for identifying the version number of the MIB data that was backed up to an external medium and can take any form that allows discrimination of a database having this state.

Figure 5:
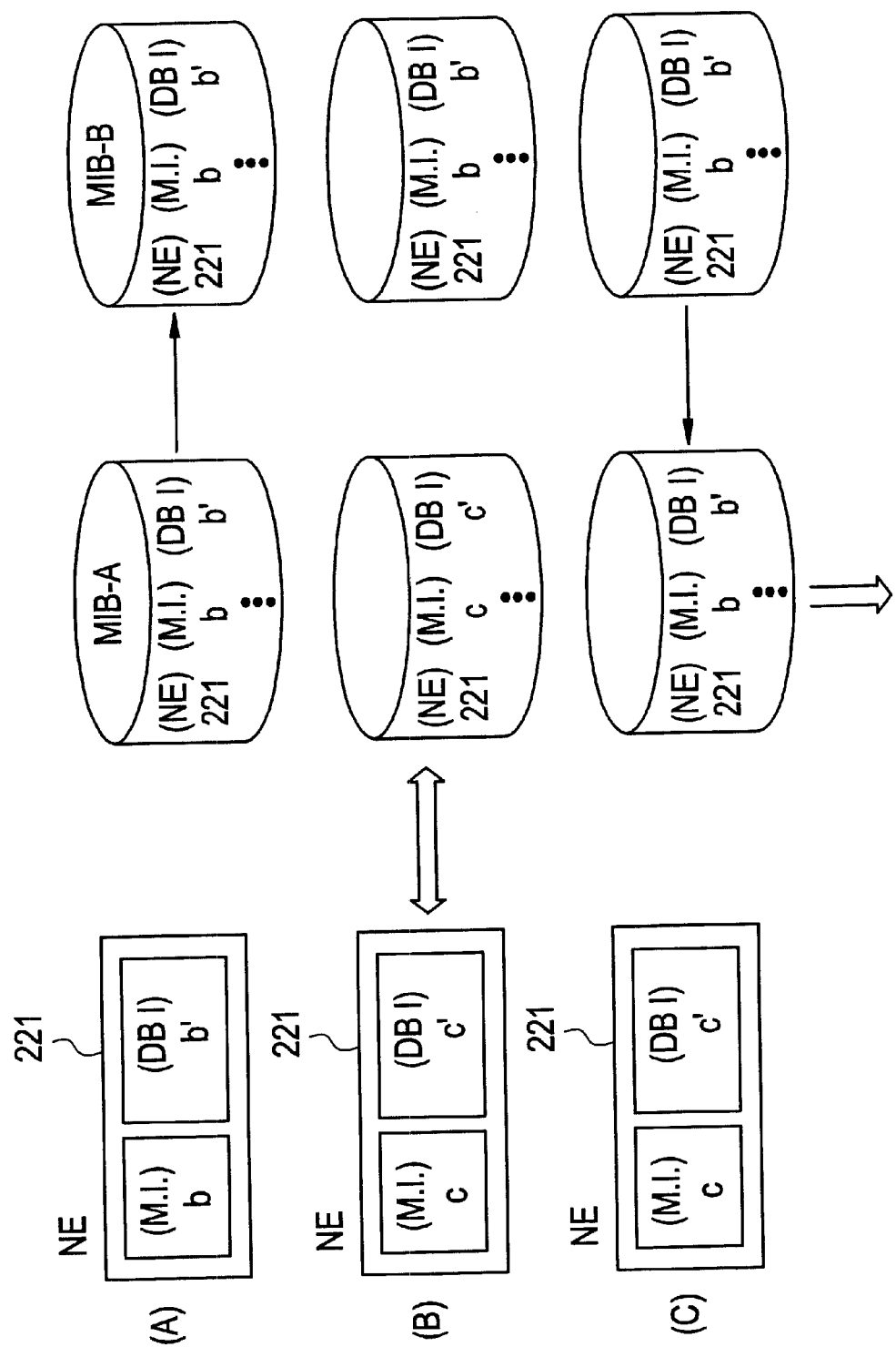
FIG. 5 is a conceptual view for explaining the state transition of database information and management information.

FIG. 5 is a conceptual view for explaining the state transition of database information and management information.

FIG. 5(A) shows the state at the time of storing back-up data in back-up database 211. Specifically, management information "b" and database information "b'" that corresponds to it are stored in NE 221; the same management information "b" and database information "b'" as NE 221 are stored as information relating to NE 221 in operation database 201, and moreover, management information "b" and database information "b'" that are held in NM 200 at the time of back-up are copied as information relating to NE 221 in back-up database 211.

FIG. 5(B) shows the state in which a particular setting operation is carried out from NM 200 to NE 221 following the state of FIG. 5(A) and the management information and database information are updated by way of a NM/NE interface. In both NE 221 and information relating to NE 221 in operation database 201 of the NM, the management information is updated from "b" to "c" and the database information is updated from "b'" to "c'". In this state, back-up database 211 is not modified in any way.

FIG. 5(C) shows the state in which the information of operation database 201 is restored by the information of back-up database 210 from the state of (B). In this state, a discrepancy occurs between operation database 201 of the NM and NE 221, the operation database 201 of the NM having management information "b" and database information "b'" while NE 221 actually has management information "c" and database information "c'."

In the present invention, NM 200, in which operation database 201 has been restored by back-up data in this way, prior to effecting operation control with respect to each NE, compares and collates the database information that is actually stored in the NE that is to be manipulated with the database information that is in the database information held by the operation database and that corresponds to the NE that is to be manipulated. If there are discrepancies, NM 200 uploads the management information that is actually stored by the NE, and using the information uploaded from the NE, synchronizes the relevant management information in operation database 201 to the most recent information to synchronize the states of the NM and the NE.

A case is next considered in which operation database 201 has been restored as described hereinabove.

For a NE that is subject to a setting operation after the database has been restored, all of the database information is subject to comparison. The NM acquires the database information from the NE that is subject to manipulation and compares it with the database information that is held by the MIB. In this case, in concrete terms, the NE database information and the MIB database information are compared and collated for each item of database information that was already explained in FIG. 4.

In a case in which the database of the NM is restored and the NE is operating normally, no change occurs in the connection relation between the NE and the accessing NM, and both the accessing NM identifier and accessed NE identifier items of database information of the NM and NE should normally agree.

However, when database information managing unit 203 compares the previous database identifier and the current database identifier with regard to the database information of NM 200 and finds that the two are different, it can detect that the operation database has been restored.

In addition, the accessing NM identifier and the accessed NE identifier may not match in the case of a complex cause, such as when failure occurs in the NE and the unit is exchanged while the NM is restoring the operation database. Explanation is next presented regarding the first embodiment and an embodiment of database information in relation to this type of case.

The database information acquired from the NE and the database information of the operation database are compared and collated regarding the database identifier and access time. In this case, either the database identifier alone fails to match or both the database identifier and the access time fail to match.

If only the database identifier is different, it is determined that the NE has not been subjected to any operation from the time of back-up until the present (the back-up data matches the data stored in the NE), and only the database identifier of the database information on the NE side is updated to match the current restored database identifier, following which management operation resumes.

If only the access time and the database identifier are different, it is determined that there has been access from the NM after back-up of the database, whereupon data are uploaded from the NE and the database of the NM is updated, and in addition, the access time and database identifier are updated to the uploaded time and current database identifier, following which the management operation resumes.

Figure 6:
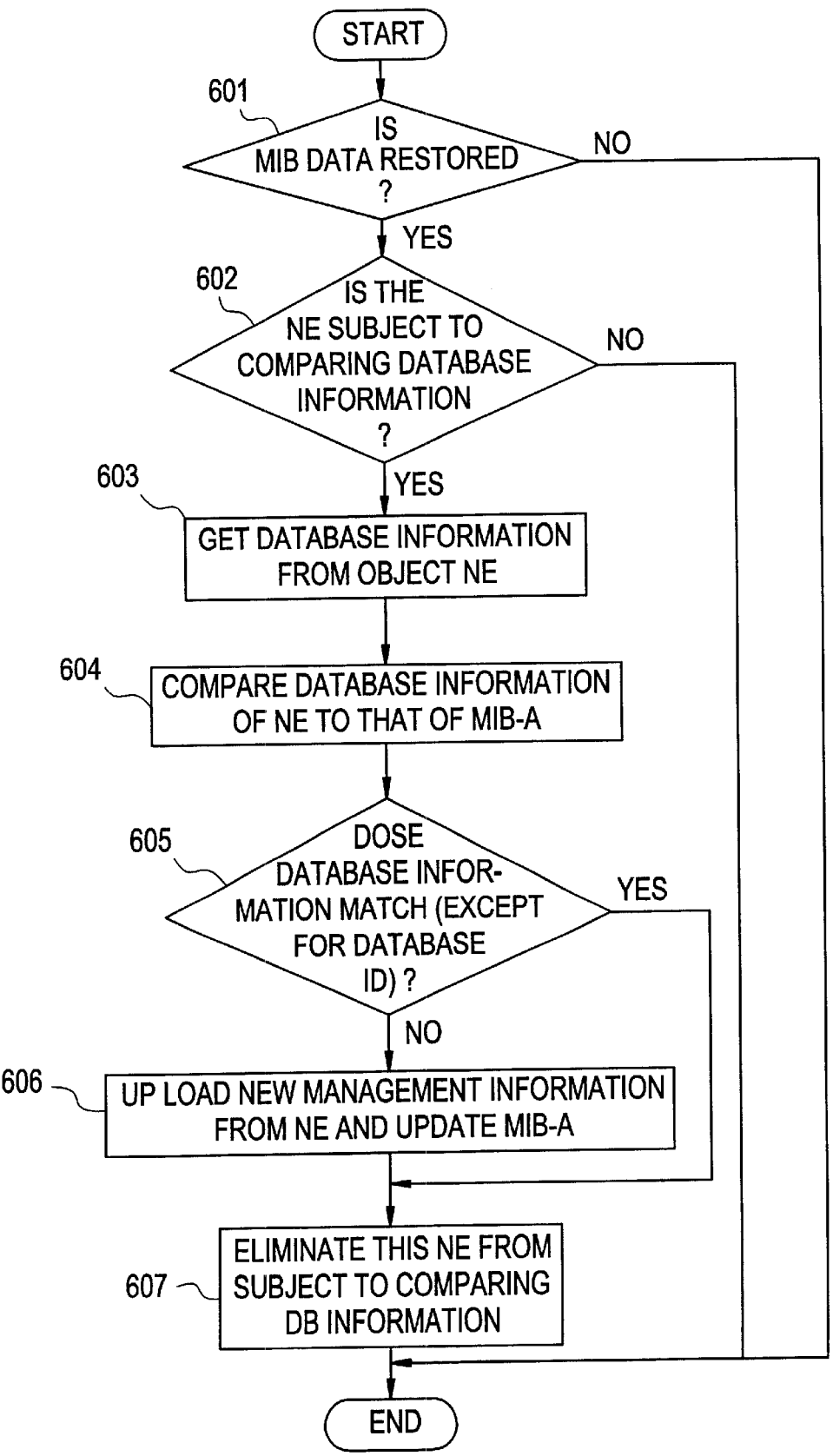
FIG. 6 is a flow chart for explaining the operation of the first embodiment.

Explanation is next presented in detail regarding the operation of this embodiment with reference to the flow chart of FIG. 6 and other figures.

NM control unit 202 and database information managing unit 203 carry out the operations shown in FIG. 6 prior to-operating and controlling each NE.

When NM control unit 202 is to set or modify management information with respect to each NE, it first identifies whether the operation database has been restored or not (601). If the operation database has not been restored, this process is completed without synchronizing the operation database and the process moves on to setting or modifying. However, if it is detected that operation database 201 has been restored with the content of back-up database 211, NM control unit 202 effects control such that database information managing unit 203 synchronizes status.

Next, database information managing unit 203 identifies whether or not the NE that is subject to the control setting transferred from NM control unit 202 is a NE that is subject to status synchronization (602).

Database information managing unit 203 manages all NE subject to management by that NM as a NE subject to status synchronization by means of the accessed NE identifier. NE information that is subject to status synchronization is reset each time operation database 201 is restored, and all registered NE become subject to status synchronization immediately following restoring.

As will be explained hereinbelow, NE that have been subjected to control for status synchronization are sequentially eliminated as subjects for synchronization, and consequently, a NE that has once been subjected to status synchronization is not subjected to status synchronization until the operation database is again restored even if manipulation or control is subsequently carried out again (602: NO).

If a NE that is subject to manipulation is subject to status synchronization (602: YES), database information managing unit 203 requests NM control unit 202 to acquire the database information stored in that NE, and the database information of the NE is acquired from the object NE by interface information (603).

Database information managing unit 203 then reads the database information corresponding to the management information of the object NE from operation database 201 and compares and collates it with the database information acquired directly from the NE (604).

In this comparison and collation, a NE that has not been subject to any manipulation from NM 200 even after back-up data have been taken, as, for example, with NE 220 in FIG. 3 or FIG. 5, database information 206 stored in operation database 203 that has been substituted by back-up database 211 matches database information 240–24N stored by the NE, with the exception of the database identifiers (605: YES). Accordingly, there is no need to synchronize the management information for this NE, and the database information of the MIB is updated (in this case, only the database identifier is updated) such that processing for status synchronization need not be carried out again upon subsequent manipulation or control, this NE is eliminated as a NE that is subject to status synchronization (607), and control of subsequent setting and manipulation is turned over to NM control unit 202 to complete the operation.

If both items of database information fail to match (605: NO), however, as, for example, in the case of a NE such as NE 221 in which the management information is modified from "b" to "c" after operation database 201 is backed up by back-up database 211, the management information of the NE that is stored in operation database 201 that has been substituted by back-up data is still "b" and the corresponding database information is "b'" even though the management information of this NE is actually "c" and the corresponding database information is "c.'" In concrete terms, the access time of the database information has been updated for this NE.

Thus, if the database information that is held by operation database 201, particularly the access time, is older, subsequent manipulation and control will bring about problems unless the management information "b" of that NE that is held in operation database 201 is synchronized to the most recent management information "c."

Database information managing unit 203 therefore requests NM control unit 202 to upload the management information "c" of this NE by means of interface information, and the management information "c" of this NE is acquired from the object NE (606). The management information of operation database 201 is then updated from "b" to "c" using this acquired management information "c" (606).

When this updating has been completed, the database information of the NM is updated such that this NE need not be subjected again to status synchronization processing at the time of setting or manipulation as described hereinabove, and this NE is eliminated as a NE subject to status synchronization (607), whereupon control is transferred to NM control unit 202 and the operation ends.

As described in the foregoing explanation, in the first embodiment of the present invention, even in a case in which the operation database is restored by back-up data and reverts to data of an older version number, the database information relating to a NE is checked before setting or manipulating the NE by comparing the data held by the NE with the data held by the operation database to determine whether or not the two are synchronized. If the data are not synchronized, the data are synchronized to the most recent management information. As a result, the operator can perform normal operation and manipulation without having to keep track of the synchronization of each NE and the content of the operation database, and the operator can therefore be relieved of an unnecessary burden.

Once a NE has been subjected to synchronization, moreover, it need not be subjected to synchronization again until the next time the operation database is restored, and a NE that has not been subjected to operation, manipulation, or control is also not subjected to synchronization, and the system is therefore relieved of any unnecessary burden.

Figure 7:
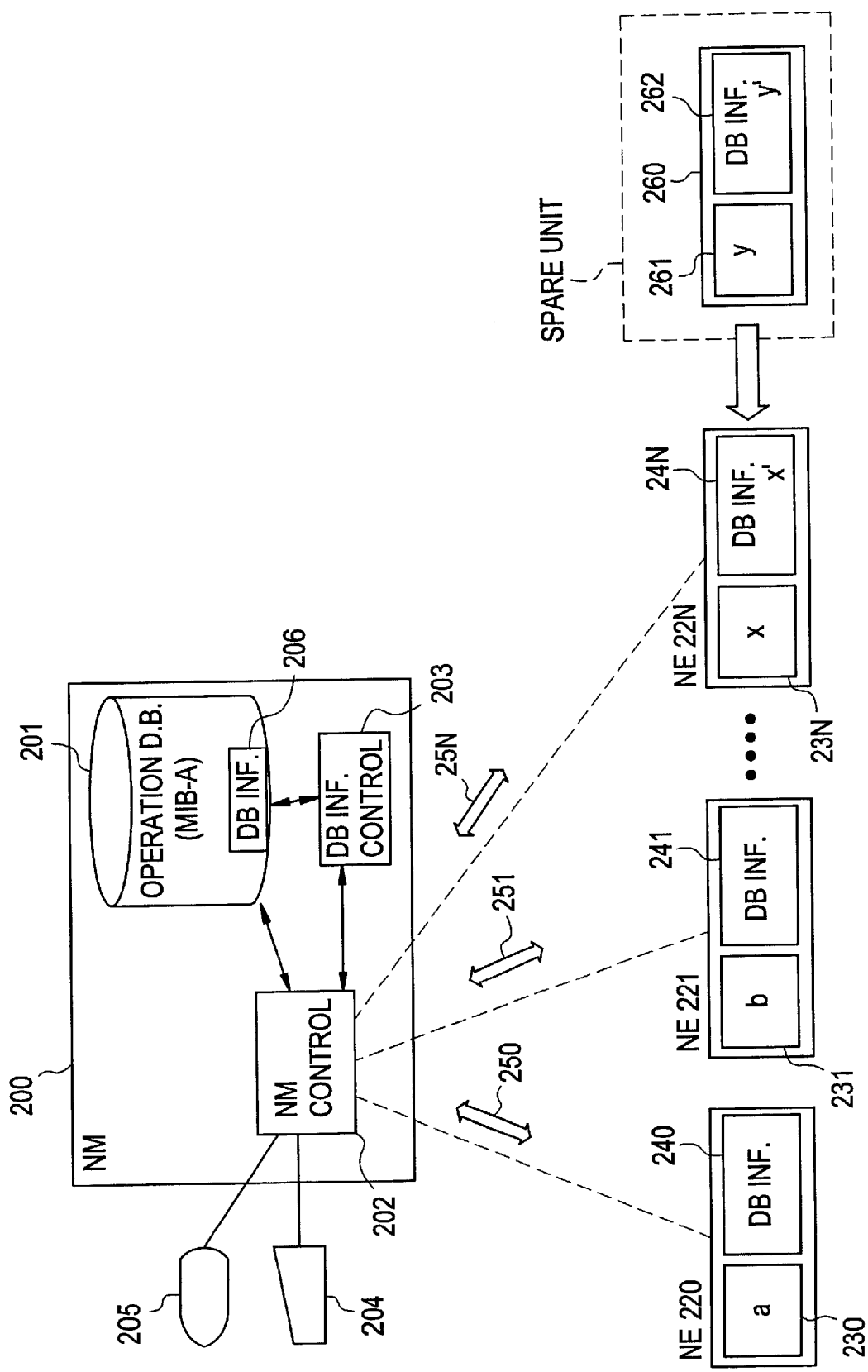
FIG. 7 is a system configuration view of the second embodiment of the present invention.
Figure 8:
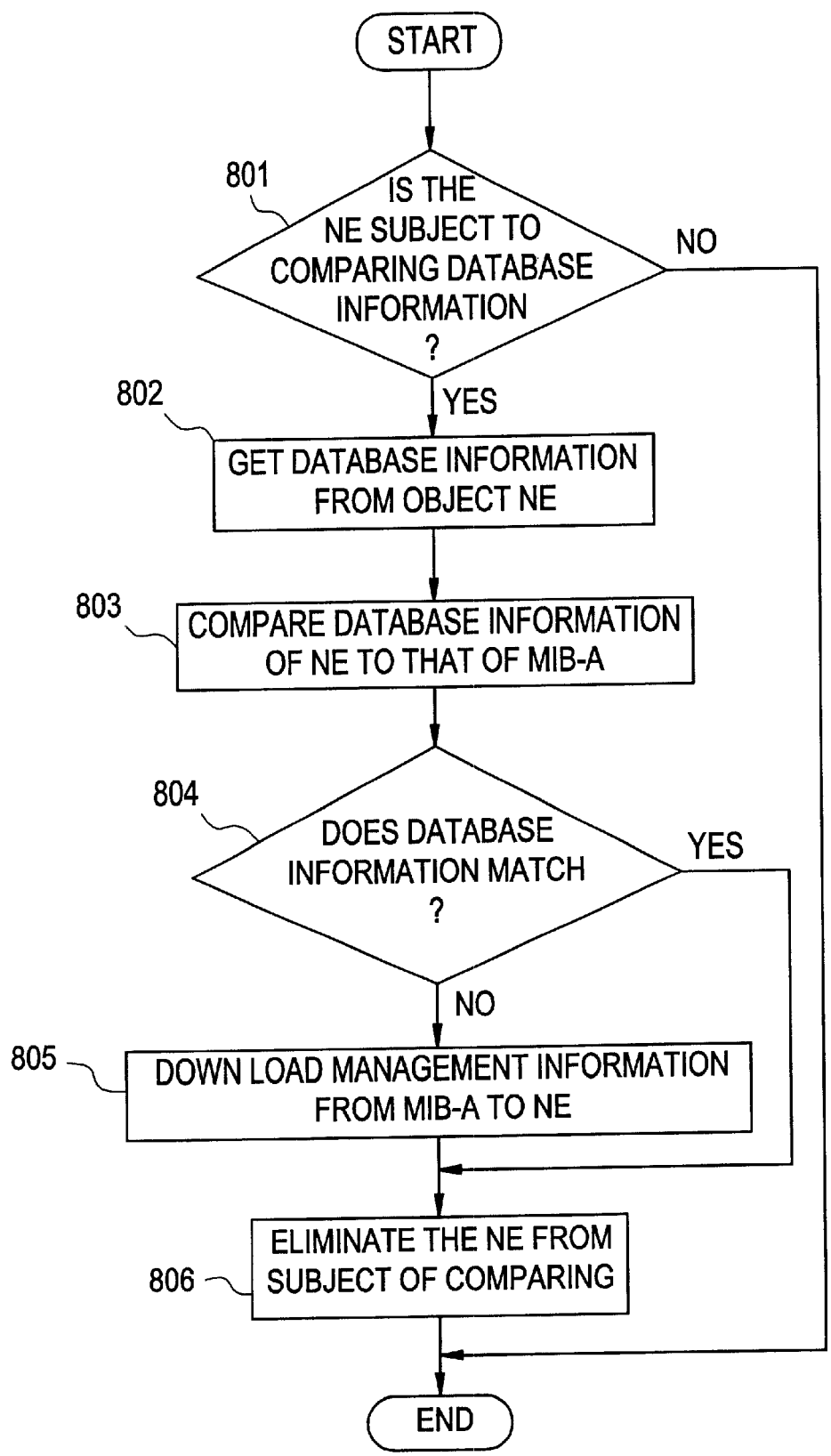
FIG. 8 is a flow chart showing the operations of the second embodiment of the present invention.

Explanation is next presented regarding the second embodiment of the present invention with reference to FIG. 7 and FIG. 8. FIG. 7 is a block diagram showing the system configuration of this embodiment. In a case in which a portion of, or the entire unit constituting a NE is exchanged due to failure, discrepancies occur between MIB data A, which is the operation database of the NM, and the management information held by each NE in which a unit has been exchanged. The second embodiment is a database recovery method that enables matching of management information in both MIB data A and the NE in such a case.

As shown in FIG. 7, NM 200 manages NE from NE 220 to NE 22N as objects of management. Each NE holds management information, for example, NE 220 holds management information "a" 230 as management information, and NE 22N holds management information "x" 23N as management information. In this case, the management information "a" to "x" corresponding to the relevant NE is also held in MIB data A in operation database 201 of NM, 200. The database information that corresponds to each item of management information is information that is updated each time management information is set from NM 200 to each NE, the content being the same as that shown in FIG. 4. In the case of this example, database information in MIB data A matches the database information held by each NE as long as relevant units within NE are not exchanged.

In addition to setting all NE as objects of status synchronization as a result of the restoring of the operation database, the NM can set and register individual NE as subjects of status synchronization upon restoration of normalcy and recovery of communication following detection of an abnormality such as a communication interruption or an alarm in individual NE. Depending on the type of abnormality that is detected at this time, the operation of the NE itself may encounter problems if the management information of the MIB data A and the NE are not synchronized at the same time as recovery from the trouble status and resumption of communication. In such a case, management information synchronization (to be explained hereinbelow) is carried out immediately without setting and registering that NE as a NE subject to status synchronization. In this case, sequential synchronization is carried out with respect to management information that is predetermined according to the content type of failure.

One case in which it can be assumed that the NE is the source of discrepancies in the management information is a case in which a unit that includes a CPU panel that stores management information is exchanged on the NE side independently of any setting and manipulation from the NM, i.e., the database of the NM is left unchanged. Concrete examples include cases in which the unit that is exchanged is a spare unit having the status at the time of shipping i.e., the default status or a unit that has already been used in another place.

Considering the database information when acquiring database information from such a NE, discrepancies occur between the database information of the NM and the NE that has been exchanged with a spare unit having the status at the time of shipping because the content of the database information is all NULL. The NM therefore determines that download to the NE in question is necessary and downloads the data. The database information that is held in the database is then set in the CPU panel of the NE to obtain the normal operation status.

In the case of exchange with a CPU panel that was used in another place, although database information and management information are already stored in this CPU panel, items in which discrepancies occur in the database information will differ according to the environment in which the CPU panel was used. To offer a concrete example, for a particular NE that is managed by another NM not shown in the figure, NM 1 is stored as the accessing NM identifier in the database information. If the unit of this NE is removed, exchanged with the unit of NE 221 subject to the management of NM 200 and then used, the accessing NM identifier will differ when the database information stored by NM 200 is compared with the database information of NE 221. If the unit of another NE that is within the range of NE subject to the management of same NM 200 is exchanged, the accessing NM identifier will match, but the accessed NE identifier will differ. Alternatively, if a unit that was previously equipped in a NE within the same NM is once exchanged and removed and then used again in the same NE, the accessing NM identifier and the accessed NE identifier will agree, but the access time will not agree.

In any of these cases, the most recent data are downloaded from the NM and the database information of the CPU panel in the unit is then rewritten to the appropriate values to achieve normal operation status.

FIG. 8 is a flow chart for explaining the operation of the second embodiment of the present invention. This flow chart is for an example in which the abnormality that occurs in a NE is of a type that does not cause problems in the operation of the NE even if the management information is not immediately synchronized, and synchronization may be carried out separately before the NM manipulates management information.

As described hereinabove, the NE is set as a NE to be subjected to synchronization of management information when: the reported abnormality is due to a power source interruption or communication interruption that accompanies unit exchange, the unit exchange of the NE is completed and recovery from the abnormal state is achieved, the prescribed connection process between the NE and NM is completed, and it is determined that the type content of abnormality that occurred does not require immediate synchronization.

Before operating, manipulating, or controlling the NE, NM control unit 202 first identifies whether or not the NE is a NE that is subject to synchronization, and if subject to synchronization, carries out control for status synchronization. Database information managing unit 203 identifies whether or not the NE that is subject to operation and manipulation that was transferred from NM control unit 202 is a NE that is subject to status synchronization (801).

If the NE that is subject to operation and manipulation is not subject to synchronization, database information managing unit 203 transfers control to NM control unit 202 without performing any process (801: NO).

If a NE that is subject to operation and manipulation is a NE that is subject to status synchronization (801: YES), database information managing unit 203 requests NM control unit 202 to acquire database information stored in the object NE from that NE, and acquires the database information of the object NE by means of interface information (802).

Database information managing unit 203 reads the database information of the object NE from data stored in operation database 201 that correspond to the management information of the NE and compares it with the database information acquired from the NE. (803).

For example, after merely tuning the unit of NE 220 and using management information "a" of NE 220 without any change, the database information stored in operation database 201 matches the database information stored by NE after recovery (804: YES). Synchronization of management information for this NE is therefore not necessary, and the NE is consequently eliminated as a NE that is subject to status synchronization in order that processing for status synchronization need not be carried out again upon subsequent manipulation and control (806), following which control is transferred to NM control unit 202 and the operation completed.

However, synchronization is necessary in a case such as that of NE 22N in which an installed unit is exchanged with another spare unit 260 because data within the NE is damaged due to a failure. In other words, management information 23N that was stored in NE 22n before unit exchange was "x" and the same management information "x" is stored in MIB data A corresponding to NE 22N. However, management information 261 that is stored in spare unit 260 is "y," this information usually being the initial data "NULL" that is set at the time of shipping from the factory. Accordingly, the management information is "x" in one set of database information but "y" in the other set of database information, and the two do not agree.

In a case in which the two sets of database information do not agree in this way (804: NO), database information managing unit 203 requests NM control unit 202 to download the management information of operation database 201 relating to this NE to the relevant NE 22N, and management information "x" is downloaded to the object NE 22N by means of interface information 25N. Management information 23N of NE 22N is then updated from "y" to "x" by this downloaded management information "x" (805). Database information 24N is also updated from "y'" to "x'" at this time.

When this updating is completed, as described hereinabove, the database information of this NE is updated and the NE is eliminated as a NE that is subject to status synchronization (806) in order that status synchronization need not be applied again to this NE when next manipulated or controlled, subsequent manipulation or control is turned over to NM control unit, and the operation is completed.

Thus, in the second embodiment of the present invention, even in a case in which the management information that is stored by a NE is changed due to unit exchange, the NM identifies the necessity of synchronization according to the category of trouble that is reported from the NE. According to the identified category of trouble, the NM distinguishes between cases in which the necessity for synchronization is urgent and cases in which separate synchronization may be carried out, and carries out synchronization at the respective timing. Accordingly, the operator of the NM can carry on operation and manipulation without keeping track of the state of the NE within the communication network, and a NM can be realized that does not place an unnecessary burden on the operator.

Explanation is next presented regarding the third embodiment of the present invention.

The third embodiment is a construction for controlling all operations of database information synchronization that takes into consideration not only the cases of the previously described first embodiment and second embodiment, i.e., database information synchronization at the time of restoring MIB data in the NM and processing when the management information of a NE changes due to, for example, unit exchange of the NE, but also complex cases in which, for example, NE trouble occurs during restoring of the NM and a unit must be exchanged.

Figure 9:
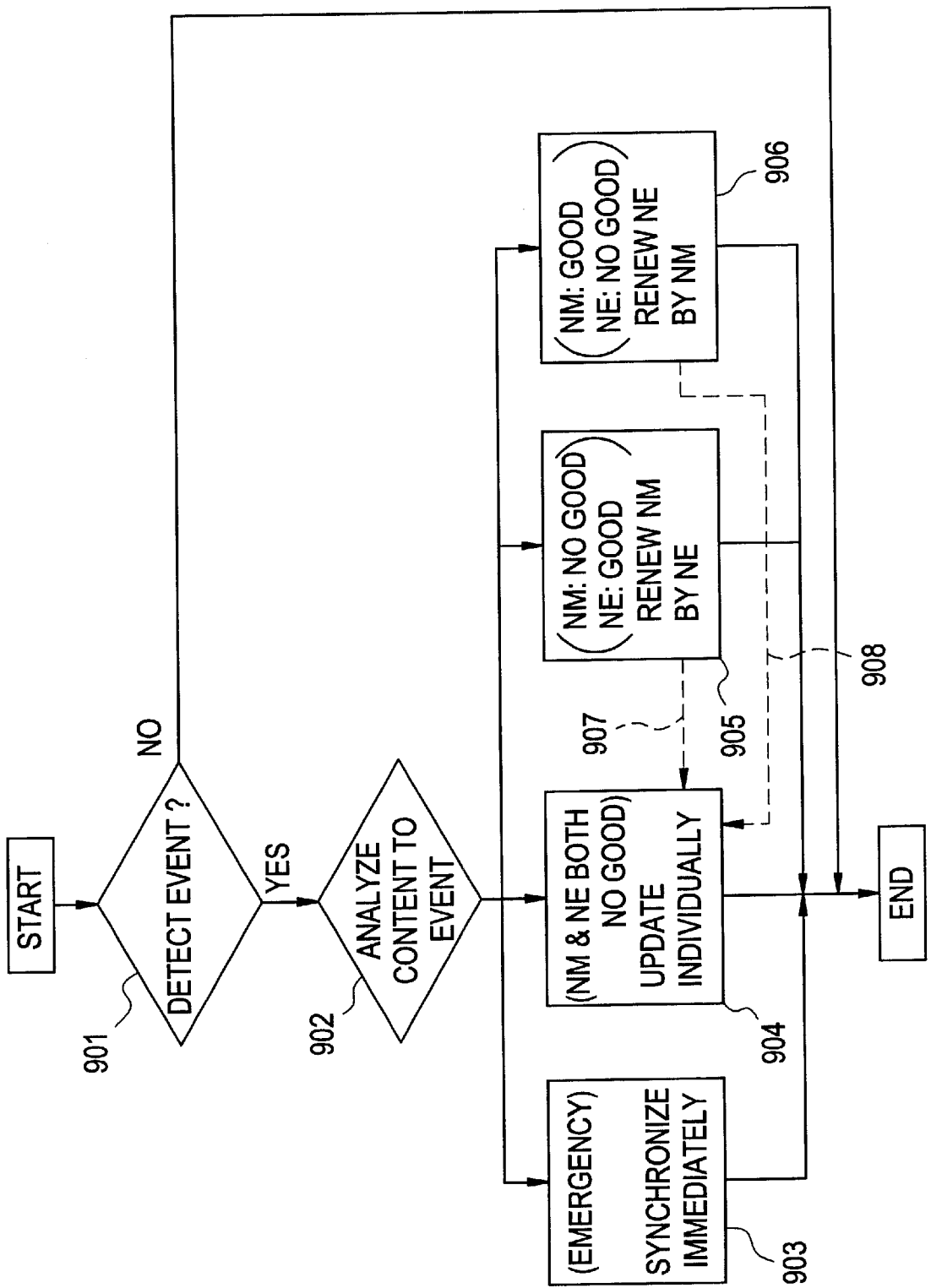
FIG. 9 is a flow chart of the third embodiment of the present invention.

FIG. 9 is a flow chart for explaining the operation of the third embodiment of the present invention.

When NM control unit 202 shown in FIG. 2 detects various abnormalities, i.e., when NM control unit 202 detects the occurrence of an event of an abnormal state such as restoring due to trouble in the NM database or NE trouble and communication recovery, it initiates a particular database synchronization operations according to each of the events, with the occurrence of the event as a trigger.

NM control unit 202 constantly monitors the occurrence of events (901); analyzes the content of the event upon detecting an event of trouble in the NM or trouble in a NE (902); according to the type of event, distinguishes between cases in which database synchronization is required immediately and cases in which synchronization need not be immediate; and moreover, in cases in which immediate synchronization is not required, distinguishes between treating only trouble of the NM, treating only trouble of a NE, and treating trouble of both the NM and NE.

When the category of event that is distinguished requires immediate synchronization of the management information of the related NE (903), synchronization of the management information is immediately carried out by downloading from the NM to the NE or uploading from the NE to the NM.

According to the succession of processes described in the first embodiment, in a case in which trouble occurs in the database on the NM side (905), before restoring of the MIB data and setting and manipulation of NE subject to management, the management information of the NE is uploaded for the NE in which discrepancies exist in database information, and the management information and database information of the NM and NE are synchronized with the most recent state.

According to the succession of processes described in the second embodiment, in a case in which database discrepancies occur that originate on the NE side (906), before operation, setting, and manipulation of a NE subject to management, the management information of the NM is downloaded to the relevant NE, and the management information and database information of the NM and NE are synchronized to the most recent state.

Finally, in a case in which restoring of the NM and alteration of the management information of NE occur at the same time (904), individual synchronization is carried out by rules that are determined in advance for system operation. Generally, the MIB data of the NM are first restored because recovery of the management information of the NM is considered more important, and synchronization is then carried out relating to NE in which trouble is detected in accordance with the condition determined as appropriate.

In each of the processes of updating the NM (905) or updating NE (906), a case in which the results of comparison of the database information relating to the NM and NE differ from the normally expected results, for example, in a case in which the NM is restored by past back-up data, following which comparison of database information shows that access information relating to NE is old even though no abnormality is detected relating to NE, some abnormality is assumed to be present and synchronization of the management information relating to the relevant NE is carried out as individual synchronization (904).

Thus, in the third embodiment of the present invention, the individual synchronization of the database can be carried out in accordance with predetermined conditions despite the occurrence of an irregular state that prevents the processing of the first embodiment or the second embodiment, thereby providing a system that enables more efficient operation.

As described hereinabove, various types of control and judgment are realized in the database recovery method of the present invention by comparing the database information that is stored in each of the NM and NE. A concrete example of the format and comparison operation of this database information is next described.

FIG. 10 is a format diagram showing a concrete example of the database information shown in FIG. 4.

As shown in FIG. 10, database information such as all of the items of the database such as identifiers and time are represented by binary numbers. As an example, time can be represented by a numerical value such as the number of seconds that have elapsed from a predetermined reference time (for example, the number of seconds that have elapsed from 0:00:00 a.m. on Dec.1, 1998). FIG. 10 shows one example of the format of database information in which the database identifier is stored in the 1–k bit range, the accessed NE identifier is stored in the k+1–l bit range, the accessing NM identifier is stored in the l+1–m bit range, and the access time is stored in the m+1–n bit range. Table A is an example of database information stored in the NM corresponding to particular management information, and Table B is an example of database information stored in a NE for corresponding management information.

In this embodiment, database information managing unit 203 compares databases by comparing each corresponding storage region or bit strings stored in storage regions of database information and then calculating whether the information agrees. In the example shown in FIG. 10, comparison is carried out of the values stored in the regions corresponding to the access time identifier (M+1–n), accessing NM identifier (l+1–m), accessed NE identifier (k+1–l), and database identifier (1–k) of the database information. If the values stored from the i bit to the j bit of each item of Table A, which is the database information of the NM, and Table B, which is the database information of a NE, are each represented as, for example, S (I→j) and T (i→j), then:

S (m+1→n)=(0 0 0 0 0 1 1 1)

T (m+1→n)=(0 0 1 1 0 1 0 1)

The comparison of each item is then carried out as follows:

(1) Comparison of database identifiers:
    i=1, j=k, S (i→j)≠T (i→j) ?

(2) Comparison of accessed NE identifiers:
    i=k+1, j=l, S (i→j)≠T (i→j) ?

(3) Comparison of accessing NM identifiers:
    i=l+1, j=m, S (i→j)≠T (i→j) ?

(4) Comparison of access time:
    i=m+1, j=n,

| | | |
|---|---|---|
| S (i → j) – T (i → j) = 0 | Access time agreement | (a) |
| S (i → j) – T (i → j) > 0 | NM management information is most recent | (b) |
| S (i → j) – T (i → j) < 0 | NE management information is most recent | (c) |

If the example of FIG. 10 is a state in which trouble does not occur in the NE, accessing NM identifier (l+1–m) and accessed NE identifier (k+1–l) agree, and database identifier (1–k) does not agree due to the occurrence of restoring. The value of S (i→j)–T (i→j) that compares the access time identifier (m+1–n) is negative, meaning the access time for the NE is more recent. In other words, it can be determined that the management information of the NE has been updated since the time of back-up and the management information of the NM should be updated using the management information of the NE.

As a working example of the calculation procedure, in a case in which, considering the event that has been detected, no NE trouble is detected and it is self-evident that the accessing NM identifier and access NE identifier agree, comparison processes (1)–(3) relating to the above-described identifiers may be skipped and only comparison process (4) relating to the access time carried out.

Further, as already explained, some abnormality relating to the management information of the NE can be inferred in a case in which the content of the received event and the results of comparison of the database information differ from the expected values, whereupon the synchronization operation can be notified and executed as an individual synchronization (904).

It is to be understood that variations and modifications of the database synchronization method and device for a network management system disclosed herein will be evident to those skilled in the art. It is intended that all such modifications and variations be included within the scope of the appended claims.

What is claimed is:

1. A database synchronization method of a network management system in which a network manager manages each of a plurality of network elements by setting or updating each management information, which includes the relevant system configuration and definitions of offered service functions of each network element, by using an operation database, which contains information that corresponds to the management information of each of said network elements, and a storage device storing data for back-up of said operation database and renewed periodically; comprising the steps of:

generating database information, which shows the update history of said each management information, and storing said database information into said operation database and the respective network element;

judging whether a matching check of data stored in said operation database is necessary or not, when the management information stored in said operation database is accessed;

in case of said matching check is judged to be necessary, acquiring the database information stored in the objective network element;

comparing and collating database information acquired from the network element with database information stored in the operation database, and detecting whether any discrepancy exists or not between them;

deciding which side of the network manager and the network element holds right data by analyzing the cause of detected discrepancy; and amending the management information and database information stored in the side which is decided to hold not correct data by the data of the other side.

2. A database synchronization method of a network management system according to claim 1, further includes steps of registering all network elements under management of said network manager into a list of network elements which are necessary to check data-matching at every time when data stored in said storage device is renewed; detecting that a subject network element is listed or not in said list of checking data-matching at every time before said network manager going to access to each network element; applying the matching-check only to the network element which is found in said list; and deleting the registration of said network element from said list of checking until next back-up data of the storage device is renewed.

3. A database synchronization method of a network management system according to claim 1, wherein said database information contains the access time when said network manager acesses to the management information stored in the network element, an access NM identifier which is an identifier of said accessing network manager, and an access NE identifier which is an identifier of said accessed network element; and in deciding step of which side holds right data, deciding that;

if said access times are different, then the side holding newer time holds proper data;

if any one or both of said access NM identifiers and said access NE identifiers are different, then some change had occurred in the network element, and data hold in said network manager is proper; and if only said database identifiers are different, then the data stored in said operation database is restored by the back-up data stored in said storage device, but data stored in said network element has not being accessed, and then renewing only the database identifier of said network element.

4. A database synchronization method of a network management system according to claim 1, wherein in case of said access from said network element to said network manager at a recovery of any discrepancy trouble of information data, judging whether the access is necessary to check in said step of judging the necessity of the matching check, and if any discrepancy is found in said step of comparing and collating, deciding that the data held in said operation database is proper and amending the data in said network element by downloading the data in said operation database.

5. A management information synchronization device of a network management system that is made up of: a plurality of network elements that constitute a communication network and that each individually store management information, in which the system configuration and functions are defined, and database information, which shows the history of modifications of said management information; and a network manager that is connected to said plurality of network elements by way of a control network and that performs control and management of each network element by setting and modifying the content of said management information of each of said network elements;

wherein said network manager comprises:

a management information database for operations for storing database information and management information corresponding to each of said network elements, and moreover, for periodically saving said stored information as back-up data;

network manager control unit for, when controlling each network element, both setting by modifying the content of said management information that is stored by that network element and updating the content of management information corresponding to that network element that is stored in said management information database to the same information content of said modification; and a database information managing unit that, when executing control management of each network element after stored information of said management information database for operations is substituted by said back-up data, compares and collates said database information that is stored in the network element with database information corresponding to the network element that is stored in said management information database, and when a discrepancy is detected between the two, updates the management information corresponding to the network element that is stored in said management information database by means of the management information that is stored in the network element.

6. A management information synchronization device of a network management system according to claim 5 wherein said database information managing unit:

when executing control management of each network element after the stored content of said management information database for operations has been substituted by, said back-up data, compares and collates said database information that is stored in the network element with the database information corresponding to the network element that is stored in said management information database for operations before executing said control management, and if discrepancy is detected in the database information comparison, updates the management information of the network element stored in said corresponding management information database by means of management information that is stored in said network element, and eliminates the network element for which the database information comparison has been carried out as a subject for database information comparison until the stored information of said management information database for operations is again substituted by said back-up data.

7. A management information synchronization device of a network management system according to claim 5 wherein said database information managing unit:

if a network element for which management information is to be controlled or managed is a network element regarding which both reports of the occurrence and the recovery from failure have been received, compares database information that is stored in that network element with database information corresponding to that network element that is stored in said management information database for operations; and if a discrepancy is detected, updates the management information of that network element by means of the management information corresponding to that network element that is stored in said management information database.

8. A management information synchronization device of a network management system according to claim 7 wherein said database information managing unit:
    identifies a category of damage that is reported from said network elements;
    when a predetermined category of damage is reported, upon receiving report of recovery from damage from the network element, compares the database information that is stored in that network element with database information corresponding to that network element that is stored in said management information database:for operations; and
    if a discrepancy is detected in the database information comparison, updates the management information of that network element using the management information that is stored in said database.

9. A database synchronization device of a network management system that is made up of: a plurality of network elements that constitute a communication network and that each individually store management information, in which the system configuration and functions are defined, and database information, which shows the history of setting and updating of said management information; and a network manager that is connected to said plurality of network elements by way of a control network and that performs control and management of each network element by setting and modifying the content of said management information of each of said network elements;
    wherein said network manager comprises:
        a management information database (MIB) for storing management information for managing network elements;
        back-up means for conferring a database identifier to MIB data used by the network manager and storing back-up data in an external medium;
        a network manager control unit for both accessing the management information of each network element and acquiring the database information from network elements; and
        a database information managing unit for managing storage of database information for each network element;
        said database information managing unit comprising:
            means for, after back-up data has been restored to the operation database of the network manager, setting all network elements managed by that network manager as subject to database information comparison; and before management information of each network element is set or manipulated, acquiring the database information of the network element that is subject to manipulation and comparing database information acquired from said network element with database information saved by the network manager;
            means for determining that the management information of that network element has not been subjected to an updating process since the time of back-up if database information other than the database identifier matches, and eliminating that network element as a subject for management information comparison and immediately carrying out setting of management information of the network element; and
            means for determining that the management information of the network element is the most recent since the time of back-up if database information other than the database identifier does not match; uploading management information from that network element; updating the management information of the network manager; and after updating, eliminating that network element as a subject for database information comparison.

10. A database synchronization device of a network management system according to claim 9 wherein said network manager comprises:
    means for detecting an event indicating an abnormal state in the network manager and the network elements; and
    means for initiating synchronization of database information according to the detected event.

11. A database synchronization device of a network management system according to claim 9 wherein said network manager control unit comprises:
    means for, when executing setting control of a network element, reading the necessary control content from a management information database that corresponds to operations relating to that network element and generating a control message; and
    means for adding database information to the control message that includes an identifier of the database that is being operated by that network manager, identifiers for each of the network manager that executes the setting operation and the network element, and the transmission time, and transmitting the result.

12. A database synchronization device of a network management system according to claim 9 wherein said database information managing unit detects that the database identifier of database information that is saved in the operation database of the network manager has been changed to the identifier of back-up data, thereby detecting restoration of the database, and initiates synchronization of database information.

13. A database synchronization device of a network management system that is made up of: a plurality of network elements that constitute a communication network and that each individually store management information, in which the system configuration and functions are defined, and database information, which shows the history of setting and updating of said management information; and a network manager that is connected to said plurality of network elements by way of a control network and that performs control and management of each network element by setting and modifying the content of said management information of each of said network elements;
    wherein said network manager comprises:
        a management information database (MIB) for storing management information for managing said network elements;
        back-up means for conferring a database identifier to MIB data operated by said network manager and for storing back-up data in an external medium;
        a network manager control unit for both accessing the management information of each network element and acquiring database information from network elements; and
        a database information managing unit that stores and manages database information, which is a history of access of management information between said network manager and said network elements, for each network element;
        and wherein said database information managing unit comprises:

means for setting as the subject of database information comparison a network element that is predicted to be the source of discrepancy in management information, acquiring database information of that network element before executing setting of that network element, and comparing and collating the database information acquired from the network element with the database information of the network manager;

means for determining that the management information of that network element has not been updated since the time of back-up until the present when database information other than the database identifier matches, eliminating that network element as a subject of management information comparison, and then executing setting of that network element; and means for determining that the management information of the network manager after the time of back-up is the most recent information when database information other than the database identifier does not match, downloading the management information of the network manager to that network element, updating the management information of that network element, and eliminating that network element as a subject of database information comparison.

14. A database synchronization device of a network management system according to claim 13 wherein said network manager comprises:

means for detecting an event that indicates an abnormality of management information relating to said network manager and network elements; and means for initiating synchronization of database information corresponding to that event.

15. A database synchronization device of a network management system according to claim 13 wherein said network manager control unit comprises:

means for reading from the management information database the content of control that is required for setting and control of management information that are to be carried out for each network element and generating a control message; and means for adding, to said control message, database information that includes an identifier of the database that is being operated by the network:manager, identifiers of the network manager and that network element, and the time of sending that control message, and transmitting the result.

* * * * *